з,632,700
Patented Jan. 4, 1972

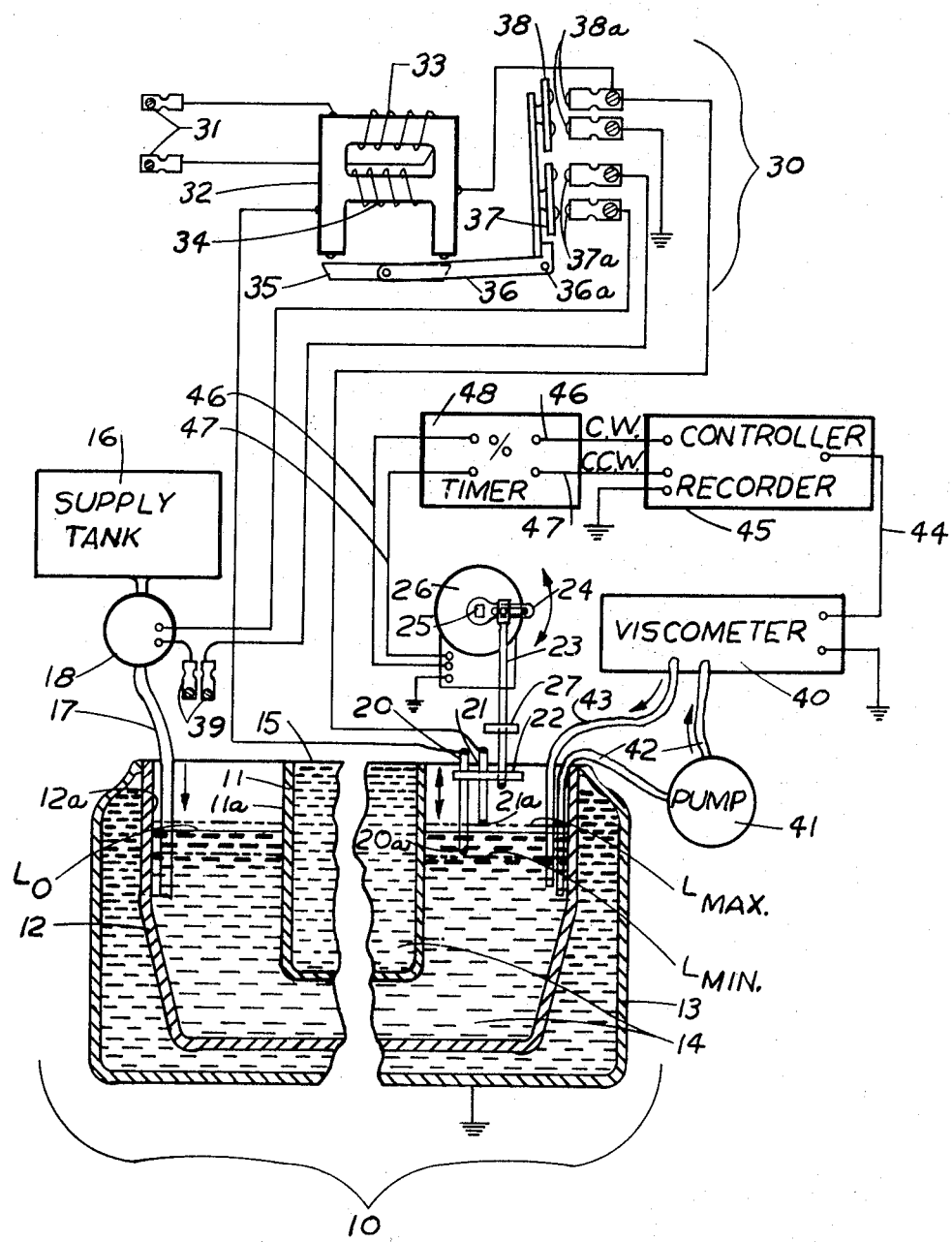

3,632,700
CAPSULE PRODUCTION APPARATUS AND METHOD
Harold J. Oglevee and Bobby R. Clement, Greenwood, S.C., assignors to Parke, Davis & Company, Detroit, Mich.
Filed Mar. 23, 1970, Ser. No. 21,942
Int. Cl. B29c 13/04
U.S. Cl. 264—40                                                       10 Claims

ABSTRACT OF THE DISCLOSURE

A quality control apparatus is provided for a capsule production machine to monitor the liquid gel solution of the mold pin dipping apparatus by automatic means involving continuous adjustment in response to viscosity measurement thereby obtaining improved results such as closer control of the wall thickness of the capsules produced.

SUMMARY AND DETAILED DESCRIPTION

This invention relates to hard shell pharmaceutical capsule production apparatus and method and more particularly to such apparatus and method wherein the exposure and viscosity of the gel solution in the dipping apparatus are closely controlled so that capsules produced by the use of such apparatus have uniformly high quality, particularly in respect to wall thickness tolerance.

As is known, the basic steps of capsule making used for many years have involved dipping capsule mold pins into aqueous gel solution to cause the pins to be covered with a film of gel solution, removing and passing the gel coated pins through elongated drying chambers to permit the gel solution to dry and to harden, cutting the dried film to length and removing the same as finished capsule parts for joining together in telescopic fashion as empty pharmaceutical capsules.

The quality of capsules produced by this prior art method has varied widely, often beyond permissible limits. A common defect has been that the capsule wall thickness is either too thin or too thick in either of which cases the capsule parts do not join and fit properly. The problem can be attributed to several sources among which may be mentioned the failure to provide adequate mixing of the gel solution in the dipping tank whereby pockets or layers of varying gel concentration are built up at various points throughout the dipping section. Another source of difficulty is excessive loss of moisture from the gel solution due to evaporation.

Prior to the present invention, various attempts have been made to overcome these problems. One such approach has been to add fresh amounts of gel solution to the dipping tank from time to time whenever shown to be necessary by sampling of capsules produced. These attempts, however, have been generally unsatisfactory and in many cases have only made the problem worse.

It is therefore an object of the present invention to provide means for regularizing the deposit of gel solution on the dipping pins for the production of pharmaceutical capsules.

It is also an object of the invention to provide means for continuous measurement of the viscosity of the gel solution for capsule dipping and for making corresponding adjustment to cause the gel solution in this respect to conform to a predetermined standard.

Still another object of the invention is to provide means for controlling the exposure of the gel solution at the dipping station of capsule production apparatus whereby the film depositing characteristics of the gel solution upon the mold pins are maintained uniform.

Yet another object of the invention is to provide inexpensive and economic means for controlling the wall thickness of pharmaceutical capsules produced by the dipping technique.

These and other objects, features and purposes of the invention will be seen in relation to the following description and accompanying drawing which is a schematic view of a capsule mold pin dipping apparatus and associated control means.

In accordance with a preferred embodiment of the invention, the dipping apparatus 10 includes a dipping pan 11 surrounded by and communicating with a reservoir tank 12 which in turn is enclosed by a water jacket 13 for uniform temperature control. The reservoir tank and dipping pan contain circulating liquid gel solution 14. Tank 11 is filled to overflowing at the dipping level 15 whereas tank 12 is partly filled to an operating level $L_O$ the location of which is variable, according to the invention, as will appear from the following description. For simplicity, the dipping apparatus 10 is shown in section and in fragmented form omitting the central portion which is conventional (see U.S. Pat. 2,975,477) and includes an end-driven gear pump serving to cycle gel solution from the reservoir tank 12 upward through the open bottom of the dipping pan 11, to the dipping level 15 and then, overflowing, back into tank 12. For adding more gel solution a supply tank 16 is located for gravity feed into the reservoir tank 12 by way of line 17 and valve 18. By the means described the gel solution level of the dipping tank is kept constant, as desired, so that in the dipping cycle the capsule mold pins (not shown), when lowered into the dipping tank to contact and pick up gel solution, are lowered and wetted each time to a predetermined constant depth.

As indicated above, the gel solution flowing over from the dipping tank and draining down along the outer wall thereof is exposed to the air. Because of this and because of exposure throughout the interface between the air and surface of the gel solution, there is a continual loss of moisture from the gel solution to the air. This loss gives rise to a thickening of the gel solution or increase in the viscosity. The loss is a continuing one so that in the ordinary course of operation the moisture needs to be replenished from time to time. This is ordinarily done by allowing fresh amounts of gel solution to be introduced from the supply tank which by comparison have a relatively higher moisture content tending to compensate for the moisture loss. In order to insure that the introduction of fresh gel solution will be maintained on a systematic basis to overcome moisture loss, the invention includes electrodes or probes 20 and 21 mounted adjustably for depth-controlling contact with the gel solution at their respective lower ends 20a and 21a. The probes 20 and 21 are independently supported in holder 22 which is made of polyacrylic plastic or other suitable material serving as an electrical insulator between the probes. Each probe is mounted in the holder for vertical adjustment by set screw means or other suitable means. The probes conveniently are made of brass or other metal compatible with the gel solution. The holder 22 is fixedly attached on a thrust rod 23 adjustably fastened to the torque arm 24 mounted on the shaft 25 of a reversible motor 26. A fixed rod guide 27 is mounted below the motor for sliding engagement with the thrust rod 23 so that the radial movement of motor-driven arm 24 is translated into a corresponding vertical movement of the rod and probe assembly either up or down in relation to the level of the gel solution. The two probes 20 and 21 are connected in an electrical circuit to an LH relay 30, 110 volt alternating current power source 31 and supply valve 18. The relay 30 has an A-shaped laminated core 32. Primary coil 33 is located on the upper bar of the core and secondary coil 34 on the lower bar. The secondary coil is selected to operate over the resistance of the liquid gel solution. An armature 35 is located below the legs of the A-core 32 and is connected to an insulated pivot arm 36 carrying two movable contact bars 37 and 38. Contact bar 37 is arranged to close the circuit at contact points 37a which circuit includes power source 39 to close valve 18 which is normally open and closes only when energized. Contact bar 38 is arranged to close the circuit for the secondary coil 34 and probes 20 and 21. In operation, with the gel solution 14 at level $L_O$ and the valve circuit open, the primary coil 33 sets up a magnetic flux which follows the line of least resistance in a circuit around the upper half of core 32. The flux generated thus passes through the lower bar of the core on which the secondary coil 34 is mounted and induces a voltage in the secondary coil. No current can flow in this coil, however, until the circuit is completed between the probe contacts 20a and 21a. The arrangement utilizes the gel solution as an electrical conductor to complete the circuit. Thus, as the open valve 18 allows gel solution to enter the reservoir 12 and raise the level $L_O$ to the desired maximum level $L_{Max.}$ just touching the probe end 21a, the secondary circuit is thereby closed so that the resulting flow of current in the circuit sets up a bucking action in the lower bar of core 32. This action diverts lines of magnetic force to the core legs and sets up an attraction that pulls the armature 35 into contact with the legs. This armature movement raises pivot arm 36 and closes the valve circuit and holding circuit at contact points 37a and 38a, respectively, due to the pivoting of arm 36 about the pivot point 36a. Closing of the valve circuit causes valve 18 to be energized so that further amounts of gel solution are blocked off from entering the reservoir 12 from the supply tank 16. The gel solution cannot therefore exceed the level $L_{Max.}$ and in fact becomes lower with passage of time. Eventually, because of evaporation and normal operating losses, it reaches the level $L_{Min.}$ at which the electrode circuit is broken just below the probe end 20a. With the holding circuit open, i.e., ungrounded, the armature 35 drops and opens the valve circuit so that the valve 18 automatically opens, whereupon tank 16 again begins to supply further amounts of gel solution to the reservoir 12 to drive the liquid level back up to $L_{Max.}$ It will be understood that the gel solution including freshly added increments are constantly being mixed and circulated so that uniformity tends to be maintained throughout.

However, according to the invention, the upper and lower limits, $L_{Max.}$ and $L_{Min.}$, originally established by the placement of probe ends 20a and 21a are subject to change as the viscosity of the gel solution 14 changes. To this end, means are provided for sensing abnormal changes in viscosity and for signalling the same to change the relative position of the probe means within the dipping apparatus thereby correspondingly altering the exposure of the gel solution to the air. In this regard increased exposure is associated with an increase in viscosity. In the preferred embodiment of the invention shown, the sensing means includes a viscometer which measures the viscosity of the gel solution delivered by a pump 41 through a sampling line 42 for return to the reservoir 12 through a return line 43. The viscometer is of a type providing a continuous viscosity reading. This reading is signalled via line 44 to a controller recorder 45 which gives a permanent written record of the viscosity in relation to time. The controller 45 is set to operate at a narrow predetermined viscosity range and to make plus or minus control adjustments, as the case may be, whenever the viscometer signals an abnormal viscosity. To make such adjustment the controller sends a signal to the reversible motor directing the motor either to raise or lower the probes 20 and 21 depending upon whether the viscosity needs to be lowered or raised respectively. The instruction to the reversible motor is sent by the appropriate clockwise line 46 or counterclockwise line 47. In order to assure, according to the invention, that the reversible motor is driven correctly and in phase, the invention contemplates means for delaying the controller's signal. One such means is the percent timer 48. The timer transmits the signal in small increments of time rather than continuously. For example, in a case where the motor is of a design which ordinarily moves the torque arm through a 180° arc in one-eighth of a minute, by means of the percent timer this movement can be delayed for a longer period, for example, fifteen minutes, such that the controller output signal is operative only about two seconds out of every one and one-half minutes. By these means, the radial movement of the torque arms 24 and associated linear movement of the probe end 20a and 21a are made at a rate phaseable with systemic viscosity change. Thus, where the viscosity of the gel solution 14 rises abnormally the sensing means in effect automatically makes a correction by causing the probes 20 and 21 and level limits $L_{Max.}$ and $L_{Min.}$ to be elevated in phase. In such case the adjustment can have two effects, namely, dilution of the gel solution by induced replenishment with low viscosity gel solution from supply tank 16 and decrease in exposure to evaporation particularly at sidewall surfaces 11A and 12a. Conversely, lowering of the probes has the opposite effect, particularly of increasing exposure to evaporation which in turn increases the viscosity.

The separate units of the apparatus of the invention are available commercially in a variety of sizes, ratings, etc., and do not require special manufacture. The following units or their equivalent, for example, have been satisfactorily used for the purpose with a conventional capsule making machine:

B/W Type LH Relay, Model LH (B/W Controller Corporation, Birmingham, Mich.); Reversible Motor, Model M630A (Actionator®, Honeywell Inc., Minneapolis, Minn.); Continuous Flow-through Viscometer (Dynamometer), Contraves Type DD (Olkon Corporation, Stamford, Conn.), 1.1 gal./minute capacity; Pump and Motor, Model 7021, Cole-Parmer Company, Chicago, Ill.; Recorder-Controller, Model Y452C21–LL–33–111–75 (Electr-O-Vane®, Honeywell Inc., Port Washington, Pa.); Solenoid Valve, 110 V.A.C., Model CR9503–208D (General Electric Company, Bloomington, Ill.).

In an actual run producing No. 1 hard shell gelatin capsules and using apparatus of the invention of the exemplary type specified, the following readings for viscosity and capsule wall thickness variation were noted at intervals over a 24-hour period:

| Hour | Relative viscosity chart scale reading | Thickness [1] variation, inches | Hour | Relative viscosity chart scale reading | Thickness [1] variation, inches |
|---|---|---|---|---|---|
| 0100 | 66 |  | 1300 | 65+ | .0001 |
| 0200 | 65 |  | 1400 | 66 | .0002 |
| 0300 | 65+ |  | 1500 | 66+ | .0001 |
| 0400 | 65+ |  | 1600 | 66 | .0003 |
| 0500 | 65+ |  | 1700 | 65+ | .0001 |
| 0600 | 65 |  | 1800 | 66 | .0002 |
| 0700 | 65 |  | 1900 | 64+ | .0003 |
| 0800 | 66 |  | 2000 | 64+ | .0003 |
| 0900 | 65 | .0002 | 2100 | 64+ | .0003+ |
| 1000 | 64 | .0002+ | 2200 | 66 | .0003+ |
| 1100 | 66 | .0004 | 2300 | 66+ | .0001+ |
| 1200 | 65 | .0001 | 2400 | 66 | .0003 |

[1] Average based on caloper measurement of the double wall thickness of 5 capsules each hour. All readings are below the target thickness.

These results show that the viscosity as recorded was maintained uniformly by the apparatus. It will be realized that the chart readings are in arbitrary units which, however, can be calibrated and expressed in actual units of viscosity. The results also show that the thickness variation was slight (0.3 mil maximum) and well within hitherto accepted industry tolerance limits for thickness.

While the invention has been described in considerable detail in the foregoing specification, it will be realized by those skilled in the art that wide variation can be made in such detail within the spirit of the invention claimed below; it is intended that the claims be interpreted to cover both the invention particularly described and any such variation.

We claim:

1. In capsule mold pin dipping apparatus including tank means associated with the dipping section adapted to be supplied with and to contain a circulating body of aqueous gel solution at a fill level subject to operational variation, the combination of supply means for adding gel solution to the tank means, level control means positioned relative to the fill level and responsive to variation of the fill level for controlling addition of gel solution from the supply means, means for measuring abnormal change in viscosity of the circulating gel solution and for signalling such change, and instrumental means responsive to such signal adapted to adjust the position of the level control means relative to the tank means to cause corrective adjustment of the viscosity.

2. The combination of claim 1 where the level control means comprises electric probe means for maximum and minimum level control.

3. The combination of claim 1 where the level control means comprises floatless probes for maximum and minimum level control.

4. The combination of claim 1 where the level control means comprises float means operative with valve means for the supply means.

5. The combination of claim 1 where the measuring means comprises a continuous flow-through viscometer.

6. The combination of claim 1 where the measuring and intrumental means comprise a continuous flow-through viscometer and an electric controller.

7. The combination of claim 1 where the instrumental means comprises time-delay signalling means.

8. In the method of capsule production by the dipping technique using dipping apparatus including tank means associated with the dipping section adapted to be supplied with and to contain a circulating body of aqueous gel solution at a fill level subject to operational variation, the steps of adding gel solution to the tank means in response to variation of the fill level sensed by level control means positioned relative to the fill level, measuring abnormal changes in viscosity of the gel solution during operation, and adjusting the position of the level control means to thereby cause corrective change in evaporative exposure so as to offset viscosity change.

9. The method of claim 8 where the viscosity of the added gel solution is low relative to that of gel solution in the tank means.

10. The method of claim 8 wherein measuring is carried out using a continuous flow-through viscometer.

References Cited

UNITED STATES PATENTS

| | | | |
|---|---|---|---|
| 2,775,257 | 12/1956 | Stirn et al. | 18—2 HA X |
| 2,869,178 | 1/1959 | Kath | 18—25 |
| 2,975,477 | 3/1961 | Hostetler | 18—25 |

ROBERT F. WHITE, Primary Examiner

J. H. SILBAUGH, Assistant Examiner

U.S. Cl. X.R.

18—2 HA, 25; 117—113; 118—7; 264—306